United States Patent Office 2,892,808
Patented June 30, 1959

---

2,892,808
EPOXY RESIN-PLASTISOL ELECTRICAL INSULATING MATERIALS AND METHOD OF MAKING SAME

John H. Shafer, Erie, Pa., assignor to General Electric Company, a corporation of New York No Drawing. Application January 20, 1958
Serial No. 709,767

8 Claims. (Cl. 260—45.5)

This invention relates to electrical insulating materials. More particularly, the invention relates to electrical insulating materials which are characterized by good heat resistance, electrical insulating qualities, good flexibility, and resistance to mechanical degradation and fire retardency.

Vinyl halide plastisol materials are well known. While such plastisols are useful in many respects at ordinary temperatures as electrical insulation, they have serious limitations as operating temperatures increase. Whereas vinyl halide plastisols may be flexible and tough at room temperature, they are soft and pliable at temperatures of around 100° C. and upward and hence are not generally useful as electrical insulation at such elevated temperatures. These resinous materials further tend to flow under pressure so that cables insulated therewith readily short out through any clamping fixtures used when the insulation is subjected to pressure, rubbing or other mechanical force. Furthermore, the plasticizer used in such plastisols tends to migrate or separate under high temperature conditions, causing failure of the insulation. It may be said generally that such plastisols based on vinyl halide are poor in their thermal resistance and that they fail as insulation in about one week at elevated temperatures of the order of 175° C., even when not subjected to mechanical stress.

Epoxy, ethoxyline or epoxide resins as they are variously called are also well known for electrical insulating purposes. Generally, such epoxy resins comprise a polyether derivative of a polyhydric organic compound, said derivative containing 1,2-epoxy groups, said compound being selected from the class consisting of polyhydric alcohols and phenols containing at least two phenolic hydroxy groups. For example, U.S. Patent 2,324,483 to Castan discloses epoxy resin compositions comprising reaction product of phenols having at least two phenolic hydroxy groups and an epihalogenohydrin such as epichlorohydrin, the product having at least two epoxy groups and being cured to a thermoset and fusible mass, by the use of carboxylic or polybasic or acid anhydride such as phthalic anhydride. The use of organic amine type materials to cure epoxy resins is also well known as set forth, for example, in Patent 2,444,333, such materials often giving a rapid cure at room temperature. However, usually the pot life of amine cured epoxy resins is comparatively short and their high temperature characteristics are often poor, as are those which are cured with acids and anhydrides generally. The use of boron trifluoride-amine complex materials as epoxy curing agents is also well known, as disclosed, for example, in Greenlee Patent 2,717,885. However, epoxy resin compositions so cured are usually rigid, both at room temperature and at high temperatures. Thus $BF_3$-amine cured epoxy resins are not useful where flexibility and resistance to mechanical shock are required. While in many applications the hard and rather brittle epoxy resinous compositions which are normally attained with polybasic acid or anhydride, amine or boron trichloride-amine complex type cures are very useful, it is sometimes desirable that a resin used as an adhesive filler, impregnant, coating and the like in conjunction with other structures such as wires, laminates, etc. be rubbery or flexible at high temperatures to prevent temperature-induced disruptive forces from tearing the structure apart. Thus, in the stator coils of electrodynamic machines, the conductor bars of which are insulated with resinous material or resin impregnated fabric, it is desirable that at high operating temperatures of the order of 100° C. and above, the insulating resin be flexible so that it will conform to the expansion and warping of the bars. By this is not meant simply heat distortion of the resin which is permanent but an ability to yield under high temperature produced stresses and to substantially recover therefrom upon the release of the stress when the temperature is lowered. It is further desirable that such materials be flexible when they are used as insulation for conductors which are subjected to continual vibration, for example, in bus bars on electric locomotives. Epoxy resin-plastisol compositions have been used as impregnants or coating materials for electrical insulation to attain the better features of each resin component. Typically tapes or fibrous insulation impregnated with such compositions require curing for about 3 to 4 hours at about 175° C. It is obvious that a 3 to 4 hour cure at 175° C. is excessively long for a high production system. In addition, curing as above produces a tape of substantially decreased flexibility, so that it is difficult if not impossible to wrap it about conductor bars and the like in its cured state.

A principal object of this invention is to provide insulation incorporating plastisol-epoxy resin compositions, which insulation has desirable physical, chemical and electrical characteristics, including high-voltage breakdown, desirable dielectric strength, good heat resistance, and resistance to cold flow and cut-through and flexibility both at high temperatures and ordinary temperatures.

It has been found unexpectedly that fibrous tape or sheet insulating materials impregnated with certain epoxy resin-plastisol compositions using $BF_3$-amine curing agents can be fully cured at elevated temperatures for short periods of time to produce flexible high temperature and flame resistant insulation having favorable physical as well as electrical characteristics. Such tapes are particularly useful for applications where the insulation cannot be cured after it has been applied to the structure to be insulated.

Briefly, the invention comprises plastisol-epoxy resin compositions and fibrous material impregnated therewith which are cured for several minutes at about 250° C. to 290° C., in which the plastisol constitutes by weight from 1 to 98% of the total ingredients and the epoxy resin component comprises from 2 to 99% of the weight of the ingredients. The epoxy resin component has as a curing agent a $BF_3$-amine complex material in the amount of from .5 to 4.5% by weight based on the weight of the epoxy resin and preferably from 3% to 4.5% by weight.

Among the plasticols which are useful in the practice of this invention are those which generally comprise finely divided dispersions of vinyl halide resins and plasticizers for the vinyl halide resin including as a dispersed phase finely divided polychlorotrifluoroethylene, polyvinylchloride, polyvinylidine, etc., finely divided copolymers of vinyl chloride and vinylidene chloride, copolymers of vinyl halides and vinyl esters in which the vinyl ester comprises a minor proportion of the total weight of the latter and the vinyl chloride prior to copolymerization, for instance, copolymers of vinyl chloride and vinyl acetate, copolymers of vinyl chloride and vinyl proprionate, etc. Preferably the average particle size of the dispersed phase is about 10 to 100 microns. The dispersing phase or plasticizer for the vinyl halide resin may comprise in addition to other modifying agents such as stabilizers for the vinyl halide resins, surface active agents, etc., dibutyl phthalate, tricresyl phosphate, dioctyl phthalate, dibutyl sebacate, dinonyl phthalate, di-(2-ethylhexyl) phthalate, glyceryl monostearate, etc. The plasticizer may comprise from about 20 to 50% by weight, of the total weight of the plastisol or plasticizer and the vinyl halide or similar type resin. In addition to plastisols comprising a vinyl halide resin and a plasticizer, the plastisols may also contain polymerizable ingredients as, for instance, unsaturated alkyd resin such as diethylene glycol maleate, dipropylene glycol maleate, as well as other copolymerizable liquid compositions having a terminal polymerizable olefinic linkage, such as styrene, acrylonitrile, diallyl phthalate, methylmethacrylate, etc. Such types of plastisols are more particularly disclosed and claimed in Loritsch et al. Patent 2,567,719, assigned to the same assignee as the present invention. This patent which also includes additional examples of plasticizers for vinyl halide resins, as well as various other examples of unsaturated alkyd resins, vinyl halide resins and copolymerizable ingredients is made by reference a part of the disclosure of this application.

The ethoxyline resins used in conjunction with my invention are, as pointed out above, well known in the art. They are described in Castan United States Patent Nos. 2,324,483 and 2,444,333, British Patent No. 518,057, and British Patent No. 579,698. Generally, the ethoxyline resins described therein are the reaction product of an epihalogenohydrin such as epichlorohydrin and a phenol having at least two phenolic hydroxy groups such as bis-(4-hydroxy phenyl)-2,2 propane. United States Patent Nos. 2,494,295, 2,500,600 and 2,511,913 describe further ethoxyline resins which can be used in conjunction with my invention. The above patents are hereby incorporated by reference in this application. The ethoxyline resins used herein have more than one epoxy group per molecule. They can be prepared by reacting a polyhydroxy alcohol or phenol such as hydroquinone, resorcinol, glycerine and condensation products of phenols with ketones, for example, bis-(4-hydroxy phenyl)-2,2-propane with epichlorohydrin. The reaction of epichlorohydrin with bis-(4-hydroxy phenyl)-2,2-propane is as follows:

Epon 828 referred to in Table I above is an epoxy resin formed from Bisphenol A and epichlorhydrin having an average molecular weight of 350 to 400 and a viscosity of 5000–15000 centipoises at 25° C. (Gardner Holdt). Epon 834 is similar to Epon 828 except that it has a molecular weight of 450 and a viscosity of $A_2$–$A_1$. Araldite 6010 is similar to Epon 828 except that it has a viscosity of 16000 cp. ERL 2774 is similar to Epon 828 except that it has a viscosity of 10500–19500 cp. Epi Rez 510 is similar to Epon 828 except that it has a viscosity of 9000–18000 cp. Additional data concerning the resins listed in Table I above may be found in Lee and Neville, Epoxy Resins, Their Application and Technology, McGraw-Hill Book Company, Inc., New York, 1957, pages 19 and 20, Table 1–3.

The boron trifluoride-organic base complex materials used herein are also well known in the art. They are conveniently prepared by adding to an ether solution of base amine as desired an ether solution of boron trifluoride-ether complex. They can also be prepared by simply bubbling boron trifluoride gas through an ether solution of a base. Preferably alkyl ethers are used such as methyl, ethyl, propyl, butyl, etc. or mixed alkyl esters as well as aryl esters, ethers, alkaryl and aralkyl ethers. Among the amines which can be used are methyl amine, ethyl amine, propyl amine, butyl amines, aniline, diethyl aniline, toluidines, chloroaniline, nitroaniline and piperidine. Also useful in the present invention are complexes prepared as above of boron trifluoride with materials such as phenol and etherate complexes alone or used in conjunction with the lactams. Other suitable ethers and base materials will occur to those skilled in the art. A $BF_3$-ethylamine complex material is commercially available from the Shell Chemical Company and is known as $BF_3$-400. Reaction products of $BF_3$ with mixtures of organic bases can be used as well as mixtures of various $BF_3$-organic base complexes. When a $BF_3$-organic base complex material is used as such to cure epoxy resins, the resulting compositions are rigid at all temperatures

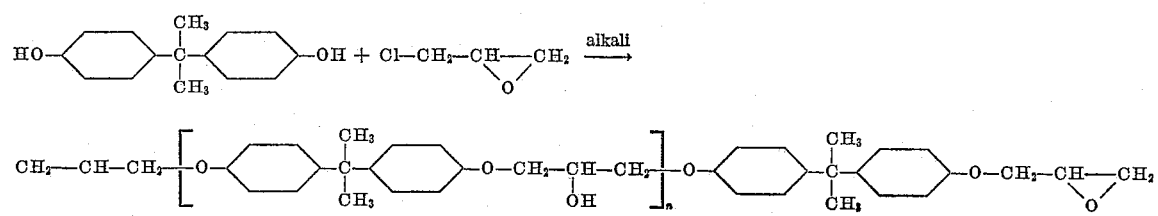

where $n$ has an average value ranging from 0 to about 10. Such ethoxyline resins are sold under the name of Epon, under the name Araldite, as ERL resins, and as Epi-Rez resins. The data given below for such resins is representative.

Table I

| Epoxy Resin | Epoxide Equivalent | M.P., ° C. |
|---|---|---|
| Epon 828 | 192 | 9. |
| Epon 834 | 225–290 | 20–28. |
| Epon 1064 | 300–375 | 40–45. |
| Araldite 6010 | 192 | Liquid. |
| Araldite 6020 | 200–205 | Do. |
| ERL 2774 | 175–200 | Do. |
| Epi-Rez 510 | 175–200 | Do. | up to about 135° C. However, when the $BF_3$-organic base complex material is used to cure the present epoxy resins in conjunction with plastisols as described, the resultant material is flexible at high temperatures, as well as at ordinary temperatures.

The following examples will illustrate the resin compositions of my invention.

There was prepared a plastisol comprising, by weight, approximately 48% polyvinylchloride, 5% polyvinylidene chloride, 15% dioctyl phthalate and 21% tricresyl phosphate, along with 11% of antimony trioxide filler. There was also prepared epoxy resin mix using Epon 828, containing 3% $BF_3$-ethylamine complex known commercially as $BF_3$-400 and sold by the Shell Chemical Company.

Other typical epoxy resin-plastisol compositions used are shown in Table 2 below.

Table 2

| Example | Type Epoxy Resin | Percent Epoxy | Percent Plastisol |
|---|---|---|---|
| 1 | Epon 828 | 2 | 98 |
| 2 | do | 5 | 95 |
| 3 | do | 20 | 80 |
| 4 | do | 30 | 70 |
| 5 | do | 35 | 65 |
| 6 | do | 40 | 60 |
| 7 | do | 50 | 50 |
| 8 | do | 60 | 40 |
| 9 | do | 80 | 20 |
| 10 | Epon 820 | 35 | 65 |
| 11 | Epon 834 | 35 | 65 |
| 12 | Araldite 502 | 35 | 65 |
| 13 | Araldite 6010 | 35 | 65 |
| 14 | Araldite 504 | 35 | 65 |
| 15 | Hysol 6020 | 35 | 65 |

The insulating materials used as a base for impregnating with the epoxy resin-plastisol compositions are any of the usual heat resistant sheet or tape fibrous materials, laminated or single ply, including those of glass fibers, asbestos, woven or otherwise. Heat resistant resinous fibers can be used where indicated, either alone or in conjunction with other fibers such as those above. For maximum strength, stretchability and flexibility, woven material is preferred, mixtures of such materials with smaller proportions or synthetic and other fibers which are not so heat resistant have been found useful for obtaining specific physical characteristics, while at the same time retaining some of their heat stability characteristics.

The following example will illustrate a typical application of this invention.

There were mixed together by weight 100 parts epoxy resin, Epon 828, including 3 parts by weight of a BF$_3$-400 curing agent and 195 parts of plastisol as above. The mixture was used to coat and impregnate the glass cloth tape about 20 mils thick and 1″ wide. When the treated glass tape was cured for from 3 to 4 hours, at 175° C., it proved to have developed very desirable electrical characteristics. However, it was not flexible enough to conveniently wrap around conductor bars. It was unexpectedly found that when the treated tape was cured for several minutes at 250° C. to 290° C. and preferably for three minutes at 250° C., a full cure was realized, still retaining essentially the flexibility of the uncured tape. The resulting tape was characterized by desirable flame and high temperature resistance pressure and other mechanical abuse. The tape can, if desired, be further sealed against dirt, etc. by a coating of cyclohexanone or similar material.

The flammability of the treated tape was tested as follows. Copper bars one inch wide and about ⅛″ thick were wrapped with the tape to be tested in a half-lapped fashion; then 7 ft. of #30 Brown and Sharpe gauge Nichrome heating wire were wrapped around the covered bar in an evenly spaced manner over an 8″ length thereof. In testing, 110 volts were impressed on the heater wire and the time of failure of the tapes timed by a stop watch, the point of failure being when the heated wire burned through the tape to the bar.

Ordinary electrical friction tape half lapped on the bar had completely powdered in about 20 minutes and a white deposit had formed after about 10 minutes. Irradiated polyethylene tape 8 mils thick, heat shrunk and sealed and two-thirds lapped on a bus bar melted and failed in about 7.5 minutes. A similar tape 10 mils thick but not heat shrunk failed in about 6.5 minutes.

A polyvinyl chloride impregnated 20 mil thick glass tape when tested as above failed in about one and one-third minutes. When held in a Bunsen flame, such a tape melted and pulled away from the bar in about two minutes.

When copper bars half lapped with 20 mil thick, 1″ wide glass fiber tape treated according to this invention were held in a Bunsen flame for 5 minutes, no flaming or deterioration of the tape was visible. After such exposure, the insulation had a dielectric strength of 270 volts per mil. When tested for flammability using the above-described heater wire test, there was no failure even after 20 minutes, at which point the dielectric strength of the material was 270 volts per mil.

Bars wrapped with the polyvinyl chloride treated tape and the tape of this invention were heat aged for 2,016 hours at 100° C. No breakdown of the new tape could be detected but hydrogen chloride was given off from the polyvinyl chloride treated tape.

At room temperature, the polyvinyl chloride treated and new tapes have a dielectric strength of about 1000 volts per mil. However, at 100° C., the new tape had a much superior dielectric strength of 230 volts per mil as compared to about 30 to 90 volts per mil for the polyvinyl chloride treated tape.

The tape of this invention is characterized by exceptional resistance to mechanical abuse. Conductor bars wrapped with such tape can be subjected to excessive tearing forces and other mechanical stress when being inserted in tight fitting slots without failure. They can actually be hit with a hammer without failure whereas a polyvinyl chloride treated tape will readily crack or split even under a light blow. The superior electrical characteristics and mechanical strength of the new tape make possible the use of much less insulation than previously required with equivalent or better results. For example, for a 3000-volt locomotive bus bar, only one layer half-lapped of the 20-mil thick glass fiber tape of the present invention is required to give a dielectric strength of 350 volts per mil at room temperature. Using polyvinyl chloride treated tape, two layers of tape treated in addition to a glass cloth tape and a layer of flame-resistant paint are required to give a dielectric strength of only 230 volts per mil.

There are provided by this invention a coating and impregnating composition and structures made therefrom which are characterized by excellent physical and electrical characteristics.

What I claim as new and desire to secure by Letters Patent of the United States is:

1. A composition of matter comprising the reaction product resulting from heating at a temperature of from about 250° C. to 290° C. for several minutes (1) a complex epoxide resin obtained by reacting a member of the group consisting of a polyhydric alcohol and a polyhydric phenol with an epihalohydrin, said product having more than one epoxy group per molecule, (2) a curing agent for said epoxide resin comprising BF$_3$-amine complex, and (3) a plastisol comprising a mixture of ingredients containing a finely divided vinyl halide resin selected from the class consisting of polyvinyl chloride, copolymers of vinyl chloride and vinyl acetate, and copolymers of vinyl chloride and vinylidine chloride dispersed in a liquid plasticizer for the vinyl halide resin.

2. A composition of matter comprising the reaction product resulting from heating at a temperature of from about 250° C. to 290° C. for several minutes (1) from 2 to 99 percent by weight of a complex epoxide resin obtained by reacting a member of the group consisting of a polyhydric alcohol and a polyhydric phenol with an epihalohydrin, said product having more than one epoxy group per molecule, said epoxide resin having incorporated therein a curing agent therefor consisting of BF$_3$-amine complex, and (2) from 1 to 98 percent by weight of a plastisol comprising a mixture of ingredients containing a finely divided vinyl halide resin selected from the class consisting of polyvinyl chloride, copolymers of vinyl chloride and vinyl acetate, and copolymers of vinyl chloride and vinylidine chloride dispersed in a liquid plasticizer for the vinyl halide resin.

3. An insulating material having a heat resistant fibrous base coated and impregnated with (1) a complex epoxide resin obtained by reacting a member of the group consisting of a polyhydric alcohol and a polyhydric phenol with an epihalohydrin, said product having more than one epoxy group per molecule, (2) BF$_3$-amine complex, and (3) a plastisol comprising a mixture of ingredients containing a finely divided vinyl halide resin selected from the class consisting of polyvinyl chloride, copolymers of vinyl chloride and vinyl acetate, and copolymers of vinyl chloride and vinylidine chloride dispersed in a liquid plasticizer for the vinyl halide resin, said insulating material being cured at a temperature from about 250° C. to 290° C. for several minutes.

4. An insulating material having a heat resistant fibrous base coated and impregnated with (1) from 2 to 99 percent by weight of a complex epoxide resin obtained by reacting a member of the group consisting of a polyhydric alcohol and a polyhydric phenol with an epihalohydrin, said product having more than one epoxy group per molecule, said epoxide resin having incorporated therein a curing agent therefor consisting of BF$_3$-amine complex, and (2) from 1 to 98 percent by weight of a plastisol comprising a mixture of ingredients containing a finely divided vinyl halide resin selected from the class consisting of polyvinyl chloride, copolymers of vinyl chloride and vinyl acetate, and copolymers of vinyl chloride and vinylidine chloride dispersed in a liquid plasticizer for the vinyl halide resin, said insulating material being cured at a temperature from about 250° C. to 290° C. for several minutes.

5. The process of making an insulating material having a heat resistant fibrous base coated and impregnated with (1) a complex epoxide resin obtained by reacting a member of the group consisting of a polyhydric alcohol and a polyhydric phenol with an epihalohydrin, said product having more than one epoxy group per molecule, (2) BF$_3$-amine complex, and (3) a plastisol comprising a mixture of ingredients containing a finely divided vinyl halide resin selected from the class consisting of polyvinyl chloride, copolymers of vinyl chloride and vinyl acetate, and copolymers of vinyl chloride and vinylidine chloride dispersed in a liquid plasticizer for the vinyl halide resin, which process comprises heating said insulating material at a temperature of from about 250° C. to 290° C. for several minutes.

6. The process of preparing an insulating material having a heat resistant fibrous base coated and impregnated with a composition comprising (1) from 2 to 99 percent by weight of a complex epoxide resin obtained by reacting a member of the group consisting of a polyhydric alcohol and a polyhydric phenol with an epihalohydrin, said product having more than one epoxy group per molecule, said epoxide resin having incorporated therein a curing agent therefor consisting of BF$_3$-amine complex, and (2) from 1 to 98 percent by weight of a plastisol comprising a mixture of ingredients containing a finely divided vinyl halide resin selected from the class consisting of polyvinyl chloride, copolymers of vinyl chloride and vinyl acetate, and copolymers of vinyl chloride and vinylidine chloride dispersed in a liquid plasticizer for the vinyl halide resin, which process comprises heating said insulating material at a temperature of from about 250° C. to 290° C. for several minutes.

7. A process of preparing a composition of matter which comprises heating at a temperature of from about 250° C. to 290° C. for several minutes (1) a complex epoxide resin obtained by reacting a member of the group consisting of a polyhydric alcohol and a polyhydric phenol with an epihalohydrin, said product having more than one epoxy group per molecule, (2) a curing agent for said epoxide resin comprising BF$_3$-amine complex, and (3) a plastisol comprising a mixture of ingredients containing a finely divided vinyl halide resin selected from the class consisting of polyvinyl chloride, copolymers of vinyl chloride and vinyl acetate, and copolymers of vinyl chloride and vinylidine chloride dispersed in a liquid plasticizer for the vinyl halide resin.

8. The process of preparing a composition of matter which comprises heating at a temperature of from about 250° C. to 290° C. for several minutes (1) from 2 to 99 percent by weight of a complex epoxide resin obtained by reacting a member of the group consisting of a polyhydric alcohol and a polyhydric phenol with an epihalohydrin, said product having more than one epoxy group per molecule, said epoxide resin having incorporated therein a curing agent therefor consisting of BF$_3$-amine complex, and (2) from 1 to 98 percent by weight of a plastisol comprising a mixture of ingredients containing a finely divided vinyl halide resin selected from the class consisting of polyvinyl chlordie, copolymers of vinyl chloride and vinyl acetate, and copolymers of vinyl chloride and vinylidine chloride dispersed in a liquid plasticizer for the vinyl halide resin.

References Cited in the file of this patent

UNITED STATES PATENTS

| 2,564,194 | Nie et al. | Aug. 14, 1951 |
| 2,707,177 | Skiff et al. | Apr. 26, 1955 |
| 2,773,043 | Zukas | Dec. 4, 1956 |
| 2,795,565 | Newey | June 11, 1957 |

FOREIGN PATENTS

| 745.060 | Great Britain | Feb. 22, 1956 |
| 780,051 | Great Britain | July 31, 1957 |
| 1,130,162 | France | Sep. 17, 1956 |